May 19, 1931. H. T. SEAMAN 1,806,025
DEVICE FOR DISTRIBUTING FERTILIZER AND THE LIKE
Filed Dec. 8, 1927 2 Sheets-Sheet 1

INVENTOR
Harry T. Seaman
BY
his ATTORNEYS

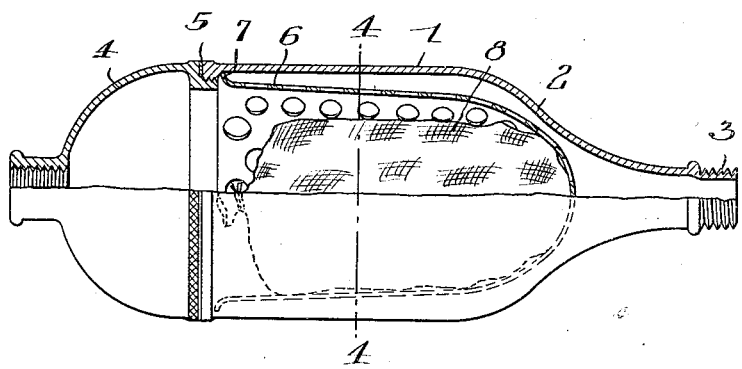
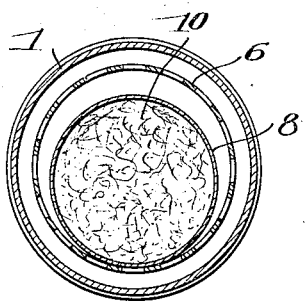
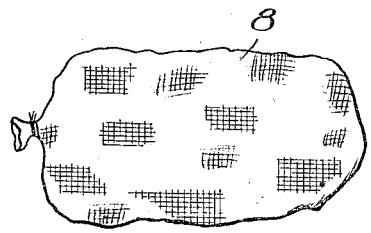

Patented May 19, 1931

1,806,025

UNITED STATES PATENT OFFICE

HARRY T. SEAMAN, OF ROCHESTER, NEW YORK

DEVICE FOR DISTRIBUTING FERTILIZER AND THE LIKE

Application filed December 8, 1927. Serial No. 238,642.

This invention relates to devices for distributing fertilizer and the like, more particularly to those of the variety, for example, adapted for use with a water hose line for dissolving and distributing fertilizers, insecticides and other chemicals.

One of the objects of the invention is to provide a device of the above character adapted for efficiency distributing soluble materials in pulverized or other forms, and so constructed as to be conveniently applicable to the ordinary garden hose for spraying purposes.

Another object is the provision of a container in the form of a coupling adapted to be inserted in a garden hose, and when so inserted to thoroughly and uniformly impregnate the water passing therethrough with the chemical contained therein. Further objects are to provide such a device which is readily disassembled, economical to manufacture, and generally superior to previous devices of similar nature.

To these and other ends the invention resides in certain improvements and combinations of parts, all as will be hereinafter more fully described, the novel features being pointed out in the claims at the end of the specification.

In the drawings:

Fig. 3 is a view partly in longitudinal section and partly in side elevation of the device;

Fig. 4 is a sectional view on the line 4—4 of Fig. 3, and

Fig. 5 is a view of the chemical container removed from the holder.

Similar reference numerals throughout the several views indicate the same parts.

Figure 1:
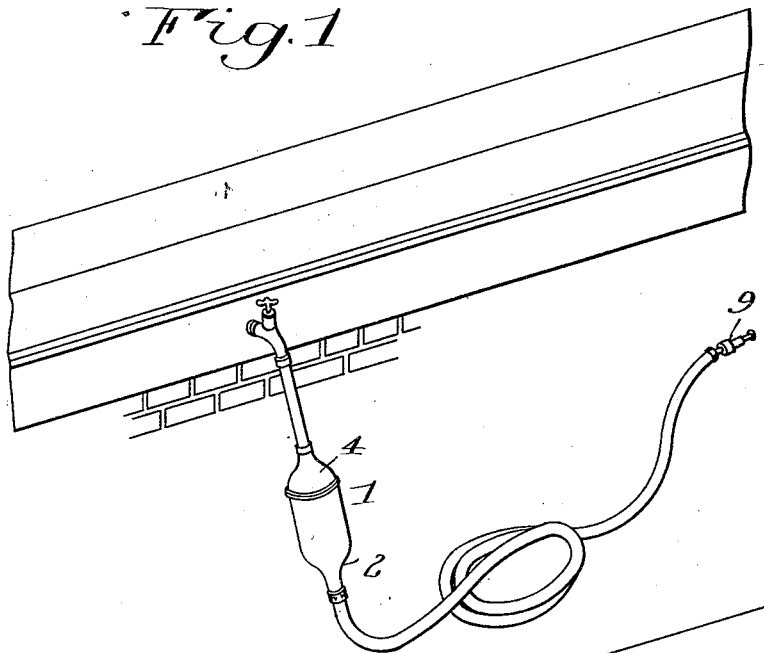
Fig. 1 is a perspective view of the device assembled ready for use.

Referring to Fig. 3 of the drawings, it will be seen that the device comprises a cylindrical body 1 contracted at one end at 2 and threaded at 3 for a hose connection, the opposite end of the body being lipped and threaded. A semi-spherical cap 4 is threaded within the open end of the body portion 1 and a gasket 5 interposed between adjacent shoulders of the cap and body in order to form a liquid tight joint.

A tapered, perforated cup 6 is located within the body 1 with a lip 7 firmly attached to the lipped portion of the body, said cup extending the full length of the cylindrical portion of the body and closely adjacent to the contracted portion 2 thereof, but out of contact therewith.

The chemical container 8 within the cup 6 is formed of fabric or other foraminous material which holds the soluble charge 10. This charge may be in a powdered or granular form, and the container 8 is designed to hold this material from being washed away in a solid state, while allowing the water free access thereto, thus causing the charge to dissolve and spend itself in a gradual and uniform manner. This container 8 with its charge of chemical is intended to be an article of commerce for distribution and sale in this form; so that the operation of recharging the distributor consists simply of unscrewing the cap 4, removing the empty bag, inserting a new filled bag and replacing the cap.

In operation the container of the chemical having been placed within the porous cup and the cap having been tightly applied to the body the device is placed in series with the ordinary garden hose, as shown for example in Fig. 1, the device being so assembled as indicated in this figure that the direction of flow of the water is toward the right in Fig. 3.

When the water is turned on, the hydrostatic pressure will force the chemical container bag against the perforations of the cup and allow the chemical to be slowly extracted therefrom to be deposited upon the plants during the spraying operation.

Figure 2:
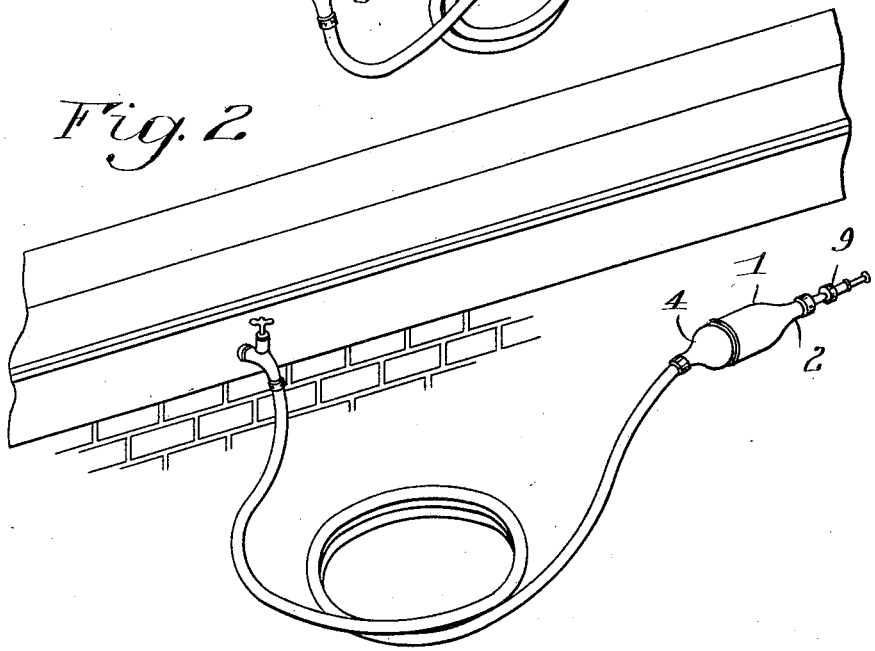
Fig. 2 is a perspective view of the device assembled in a slightly different relationship with respect to the auxiliaries.

In Fig. 2 the device is shown adjacent to and forming a unit with the spraying nozzle. This arrangement is often preferred by reason of the added convenience for the operation of recharging secured thereby. With this arrangement the body 1 with the nozzle 9 attached thereto, may be unscrewed from the cap 4 and a new container substituted for the exhausted one without the necessity of breaking any hose connection.

It will be noted that the contracted portion 2 of the body is so streamlined as to cause the least possible hindrance to the flow of water therethrough, and so as to avoid any turbulence at this point which might cause the process of extraction to proceed unevenly. Furthermore, it will be seen that the constricted passage between the lower end of the cup 6 and the contracted portion 2 of the body will cause the most rapid flow of water at this point. This will cause the extraction of the chemical to proceed most rapidly in the zone adjacent thereto and inasmuch as the fabric container is being constantly forced toward that zone by the water pressure, it is apparent that the extracting action will be substantially uniform so long as an appreciable quantity of chemical remains in the bag.

I claim as my invention:

1. A portable device for insertion in a water line for distributing fertilizer or the like, comprising a hollow body having a smoothly contracted discharge end and having its other end closed and provide with an inlet, a perforated container housed in said body having an open end secured to the body adjacent its inlet end and having a closed contracted end located within said contracted end of the body and adjacent but spaced from the walls thereof to form a restricted passage therebetween, and a yieldable fabric container adapted to be detachably located in said perforated inner container and pressed toward the closed end thereof by water passing through said device.

2. A portable device for insertion in a hose line for distributing fertilizer and the like, comprising a cylindrical body portion smoothly contracted and threaded at its discharge end for connection with a hose and closed at its other end by a threaded cap, a perforated cup having an open end secured to said body portion and a closed semi-spherical opposite end located within said contracted end of the body portion and adjacent but spaced from the walls thereof to form a restricted passage therebetween, and a yieldable fabric container adapted to be detachably located in said cup and pressed toward the closed end thereof by the current of water passing through said device.

HARRY T. SEAMAN.